(12) United States Patent
Arquié et al.

(10) Patent No.: US 6,636,239 B1
(45) Date of Patent: Oct. 21, 2003

(54) METHOD OF OPERATING A GRAPHICAL USER INTERFACE TO SELECTIVELY ENABLE AND DISABLE A DATAPATH IN A NETWORK

(75) Inventors: Louis Arquié, Cupertino, CA (US); Larry L. Cornett, Campbell, CA (US)

(73) Assignee: Sanavigator, Inc., Broomfield, CO (US)

( * ) Notice: Subject to any disclaimer, the term of this patent is extended or adjusted under 35 U.S.C. 154(b) by 0 days.

(21) Appl. No.: 09/512,973

(22) Filed: Feb. 24, 2000

(51) Int. Cl.$^7$ ................................. G09G 5/00
(52) U.S. Cl. ................. 345/736; 345/734; 345/735; 345/853; 709/220
(58) Field of Search .................. 345/734, 735, 345/736, 737, 853, 854, 855; 709/220, 221, 223, 224, 227

(56) References Cited

U.S. PATENT DOCUMENTS

| | | | |
|---|---|---|---|
| 4,821,034 A | 4/1989 | Anderson et al. | |
| 5,063,520 A | * 11/1991 | Klein | ............................ 703/1 |
| 5,367,517 A | * 11/1994 | Cidon et al. | ................ 370/230 |
| 5,394,106 A | 2/1995 | Black et al. | |
| 5,394,522 A | * 2/1995 | Sanchez-Frank et al. | ... 345/735 |
| 5,521,909 A | * 5/1996 | Holloway et al. | .......... 370/404 |
| 5,748,612 A | 5/1998 | Stoevhase et al. | |
| 5,751,715 A | 5/1998 | Chan et al. | |
| 5,793,612 A | 8/1998 | Tobin et al. | |
| 5,828,475 A | 10/1998 | Bennett et al. | |
| 5,835,496 A | 11/1998 | Yeung et al. | |
| 5,872,822 A | 2/1999 | Bennett et al. | |
| 5,894,481 A | 4/1999 | Book | |
| 5,910,803 A | * 6/1999 | Grau et al. | .................. 345/734 |
| 5,978,379 A | 11/1999 | Chan et al. | |
| 6,000,020 A | 12/1999 | Chin et al | |
| 6,014,715 A | 1/2000 | Stoevhase | |
| 6,137,782 A | * 10/2000 | Sharon et al. | .............. 370/244 |
| 6,154,212 A | * 11/2000 | Eick et al. | ................... 345/848 |
| 6,330,005 B1 | * 12/2001 | Tonelli et al. | ............... 345/734 |

* cited by examiner

Primary Examiner—Ba Huynh
(74) Attorney, Agent, or Firm—Hogan & Hartson L.L.P.

(57) ABSTRACT

Disclosed is a method of operating a graphical user interface to allow a user to selectively enable or disable a data path that is connected to communications between a first node and a second node of a switched network, such as a storage area network (SAN). The method comprises the steps of displaying a graphical representation of the datapath on a display, displaying a cursor on the display whose image position on the display is under control by the user, detecting when the image position of the cursor is in a predetermined distance from the graphical representation of the datapath, highlighting the graphical representation of the datapath when the displayed cursor is detected to be within the predetermined distance, and then selectively enabling or disabling the datapath of the network that corresponds to the highlighted graphical representation in response to an input signal controlled by the user.

10 Claims, 10 Drawing Sheets

METHOD OF OPERATING A GRAPHICAL USER INTERFACE TO SELECTIVELY ENABLE AND DISABLE A DATAPATH IN A NETWORK

FIELD OF INVENTION

The present invention relates to a method of selectively enabling or disabling a datapath in a network, such as a storage area network.

BACKGROUND INFORMATION

There are a variety of reasons for providing a user an ability to enable or disable a datapath in a network. For example, in a storage area network (SAN), one reason may be to protect memory locations from certain servers or hosts. At present, known techniques for addressing the enabling or disabling of datapaths in potentially complex network layouts of nodes and datapaths require substantial manual intervention. Any user interface associated with the network is static in that it shows a given configuration of the layout, but does not allow for an interactive, dynamic reconfiguration of the network.

One method of enabling and disabling a datapath in a network, particularly in a SAN, involves manually creating a diagram of the SAN on paper to map out all of the possible datapath connections between the different nodes in the SAN. The next step is to evaluate the effects on the SAN for the enablement or disablement of each datapath connection. The process of evaluating the effects of enabling and disabling a datapath becomes more complicated as the resulting diagram and analysis becomes more complex. The result of this manual mapping process is a matrix displaying all of the possible datapath connections that may be enabled or disabled in the SAN.

Another method of mapping connections in a SAN involves using zoning techniques. These processes include establishing a geometric representation of the SAN. The geometric representation includes a plurality of nodes identified by a symbol, such as the letter "X". The user analyzes the datapath connections by encircling a portion of the node representations to make a subset of the universe of nodes identified on the diagram. This process is repeated until a series of subsets are drawn on the diagram showing the portions of the subsets that are overlapping. The overlapping sections identify the nodes that are connected by a datapath and, likewise, show the no overlapping subset portions identifying the nodes that are not connected by a datapath. This process is complete after the connections in the SAN are analyzed. To reconfigure datapaths between nodes, the entire process must be repeated.

The above methods of mapping connections in a network require manually creating a series of diagrams in the network to visualize the datapaths. When the datapaths are reconfigured between nodes in the network, the required process must be repeated. Presently, there is no automated user interface which provides for the selective enabling or disabling of datapaths in a network to dynamically reconfigure the network.

SUMMARY OF THE INVENTION

In an exemplary embodiment, a method is disclosed for operating a graphical user interface to allow a user to selectively enable and disable a datapath that is connected to carry communications between a first node and a second node of a switched network, such as a storage area network. The method comprises the steps of displaying a graphical representation of the datapath on a display, displaying a cursor on the display whose image position on the display is under control by the user, selecting the first node, detecting when the image position of the cursor is within a predetermined distance from the graphical representation of at least one of the datapath and the second node, highlighting the graphical representation of the datapath when the displayed cursor is detected to be within the predetermined distance, and then selectively enabling or disabling the datapath of the switched network that corresponds to the highlighted graphical representation in response to an input signal controlled by the user.

Another aspect of the invention is a method for operating a graphical user interface with an input signal that is controlled by the user by actuating a mouse.

In yet another aspect of the invention, a method is disclosed for operating a graphical user interface including the step of providing a pop-up menu on the display in response to the input signal controlled by the user.

In another aspect of the present invention, a method is disclosed for operating a graphical user interface comprising the step of sending commands to the storage area network after selectively enabling or disabling of the datapath.

In yet another aspect of the present invention, a method is disclosed for operating a graphical user interface comprising the step of producing signals for selectively enabling or disabling the data path in the storage area network.

In another aspect of the present invention, a method is disclosed for operating a graphical user interface wherein the network is a storage area network.

In yet another aspect of the present invention, a method is disclosed for operating a graphical user interface comprising the step of highlighting the graphical representation of the datapath at the time the first node is selected.

In another aspect of the present invention, a method is disclosed for operating a graphical user interface wherein the highlighting of the graphical representation of the datapath communicates to the user whether the datapath is enabled or disabled and whether the datapath is selected or unselected.

The foregoing and other advantages of the present invention will become more apparent from the following description and accompanying drawings.

DETAILED DESCRIPTION OF THE PREFERRED EMBODIMENTS

Figure 1:
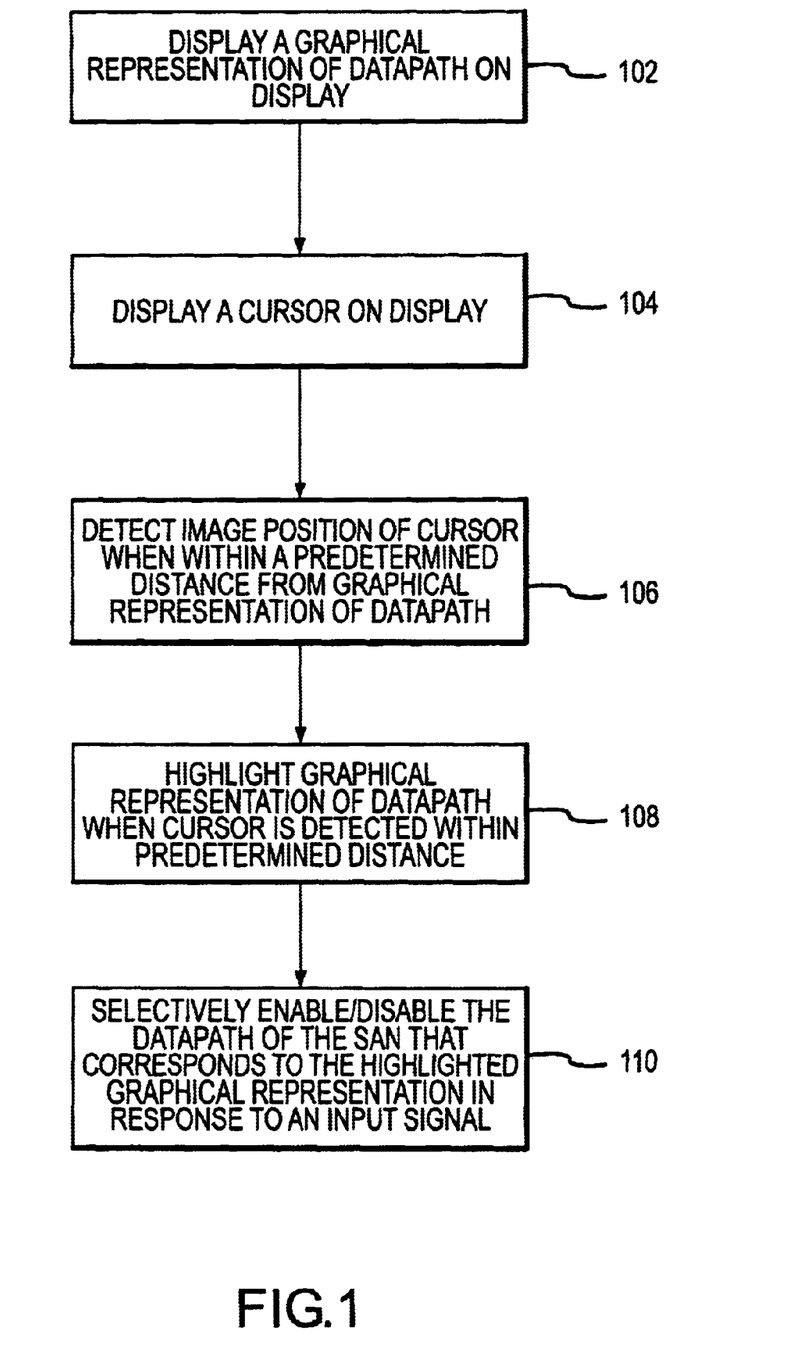
FIG. 1 is a flowchart illustrating a method of selectively enabling or disabling a datapath in a network according to an exemplary embodiment of the present invention.

FIG. 1 illustrates an exemplary method of operating a graphical user interface to allow a user to selectively enable or disable a datapath connected to carry communication between a first node and a second node of a network. The network shown is a switched network, such as a SAN, although the invention is applicable to any network. The method includes a step 102 of displaying a graphical representation of the datapath on a display, and a step 104 of displaying a cursor on the display whose image position on the display is under control of the user. The first node (e.g., source node or a destination node) is selected, and movement of the image position of the cursor is detected in step 106 to determine when it is within a predetermined distance from the graphical representation of at least one of the datapath and the second node. The graphical representation of at least one of the datapath is highlighted in step 108 when the displayed cursor is detected to be within the predetermined distance. In step 110, the highlighted datapath can be selectively enabled or disabled in response to an input signal by the user.

Figure 2:
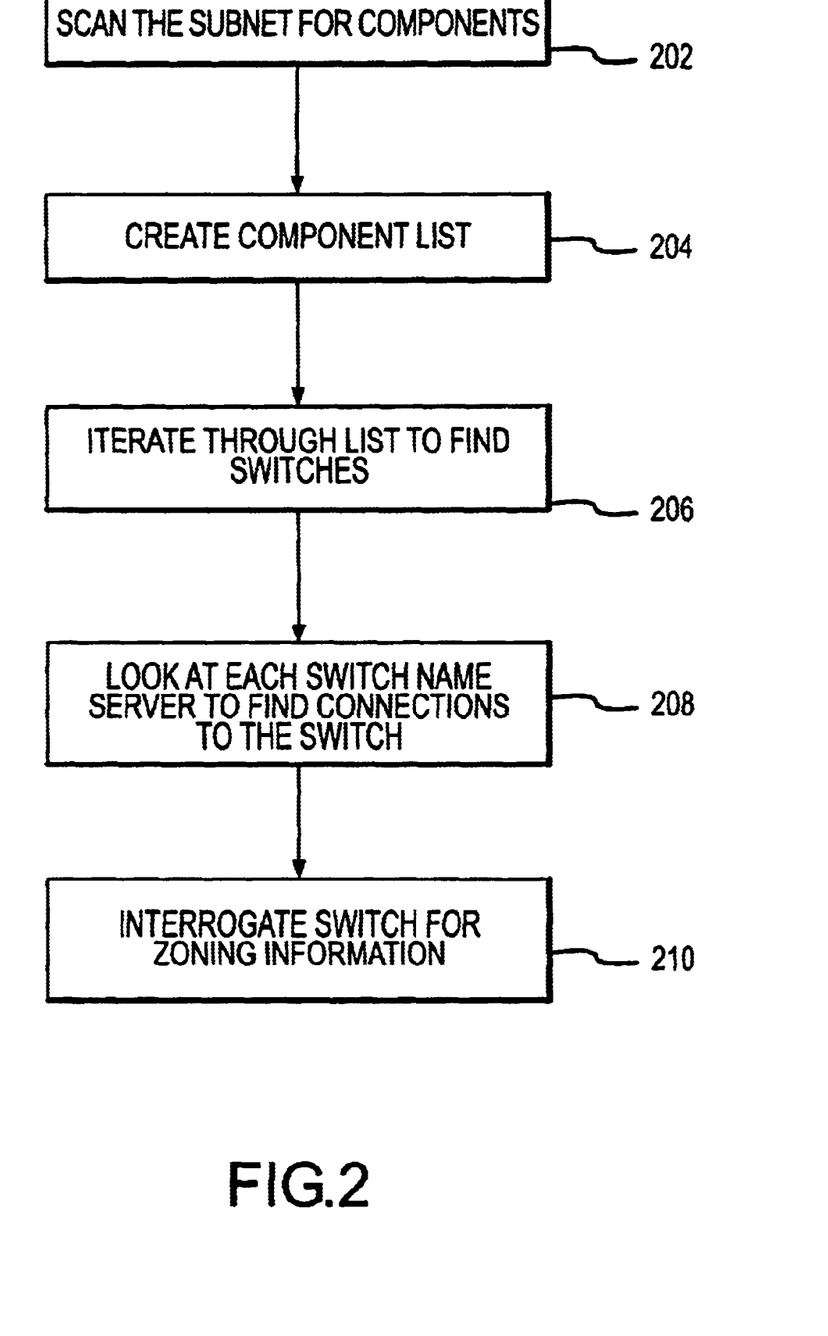
FIG. 2 is a flowchart illustrating an exemplary method of polling the components in the network according to the present invention.

Referring to FIG. 2, a discovery process is presented in the exemplary flow chart shown. This process allows the system to determine which components are included in the SAN. The first step 202 in the process includes scanning the subnet for components in the SAN. A component list is created in step 204. The system iterates through the list to find switches in the SAN in step 206. In step 208, the system looks at each switch name server to find connections to each switch. Finally, the system interrogates each switch for zoning information in step 210.

Figure 3:
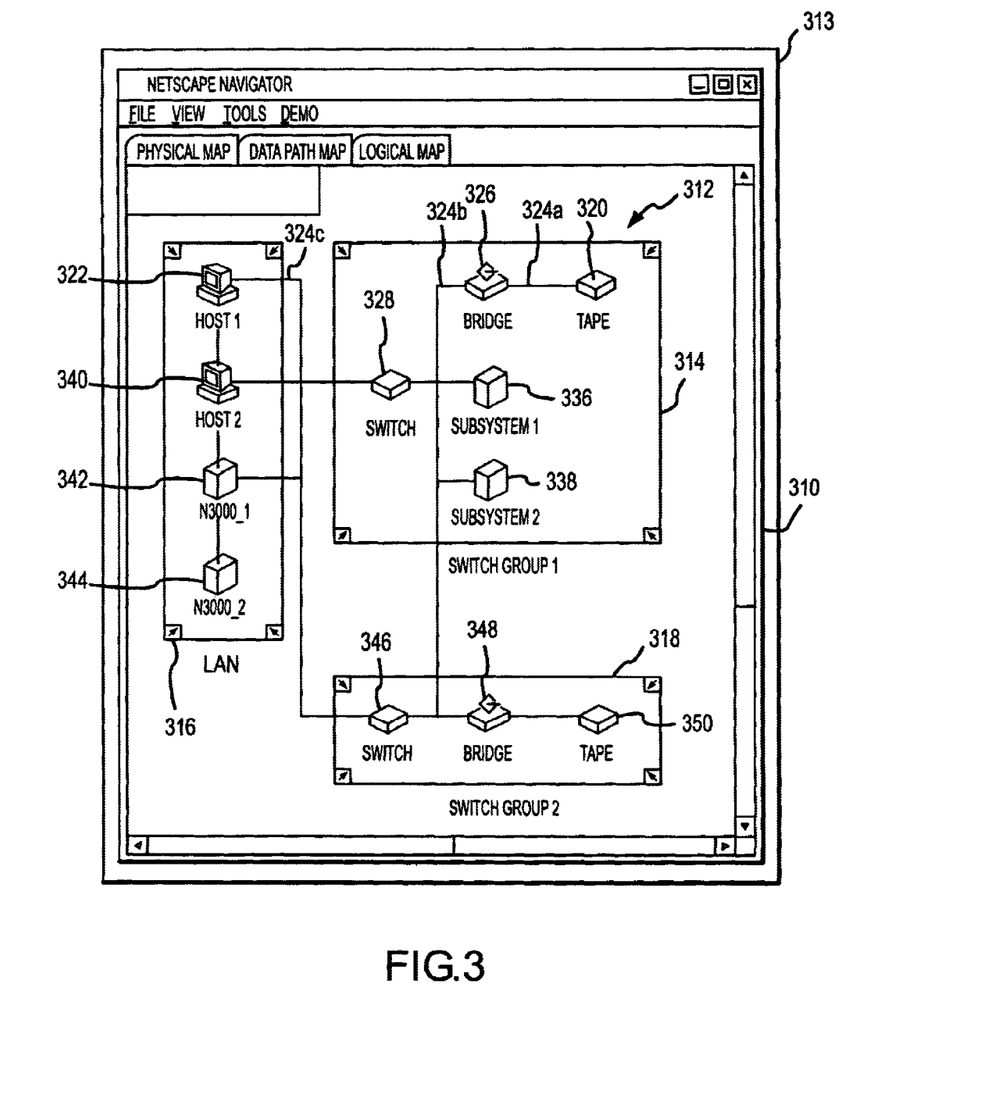
FIG. 3 is a graphical representation of an exemplary network shown on a display according to the present invention.

Referring to FIG. 3, a graphical user interface includes a graphical representation 310 of a SAN shown on a display 313. The SAN can include a number of components and groups. For example, the SAN 312 shown in FIG. 3 includes a first switch group 314 connected to a local area network (LAN) 316 and a second switch group 318. Included in the first switch group 314 is a first node shown as a tape component 320, which is connected to a second node shown as a host 322 of the LAN 316. The first and second nodes are shown to be connected by a graphical representation of a datapath. The actual datapath carries communications between the first and second nodes 320 and 322. The representation of the datapath includes a first segment 324*a* that extends from the first node 320 to another node or bridge 326, a second datapath segment 324*b* that extends from node 326 to node or switch 328, and datapath segment 324*c* that extends from node 328 to node 322. The first switch group 314 further includes a first subsystem 336, further connected to a second subsystem 338. LAN 316 includes the components of a second host 340 connected to a first component 342 which is connected to a second component 344. The second switch group 318 includes switch 346 connected to bridge 348 which is further connected to tape 350.

Figure 4:
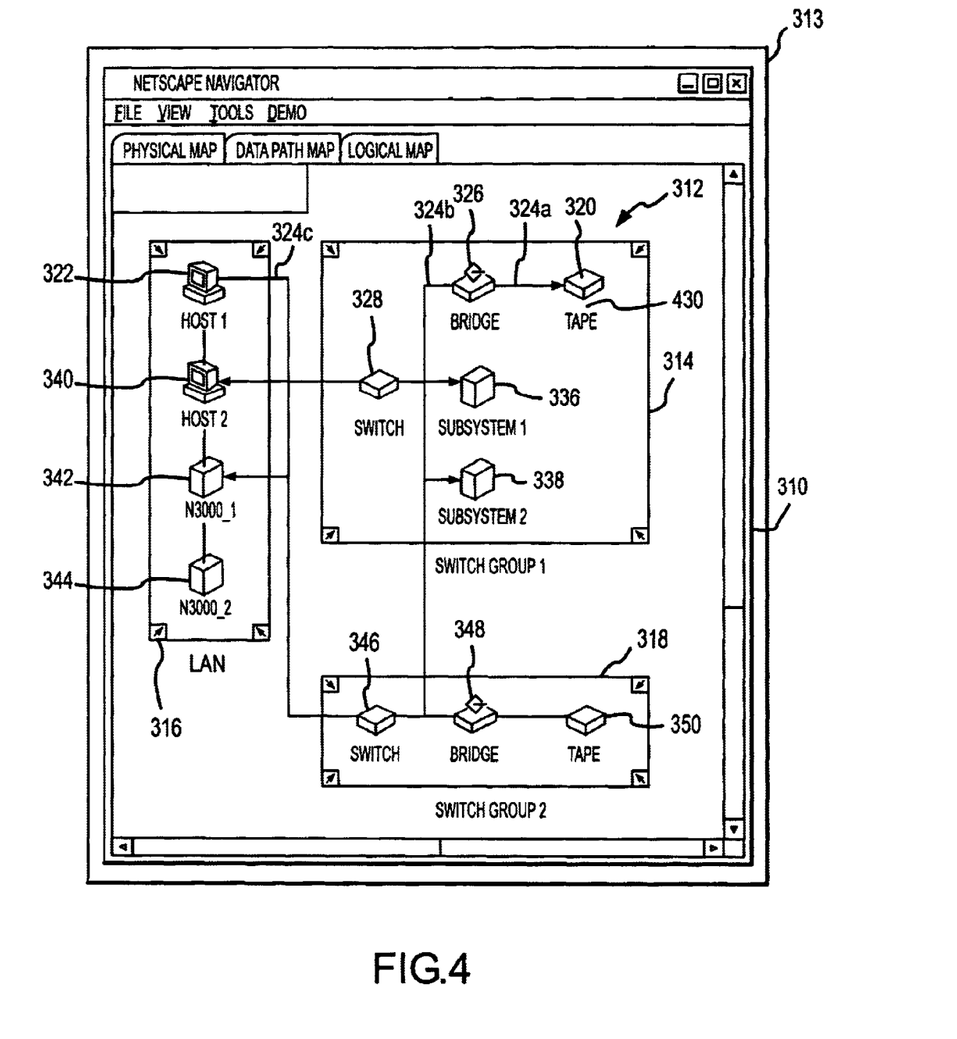
FIG. 4 is a graphical representation of the FIG. 3 network with a cursor shown in the display overlapping the graphical representation of the network.
Figure 5:
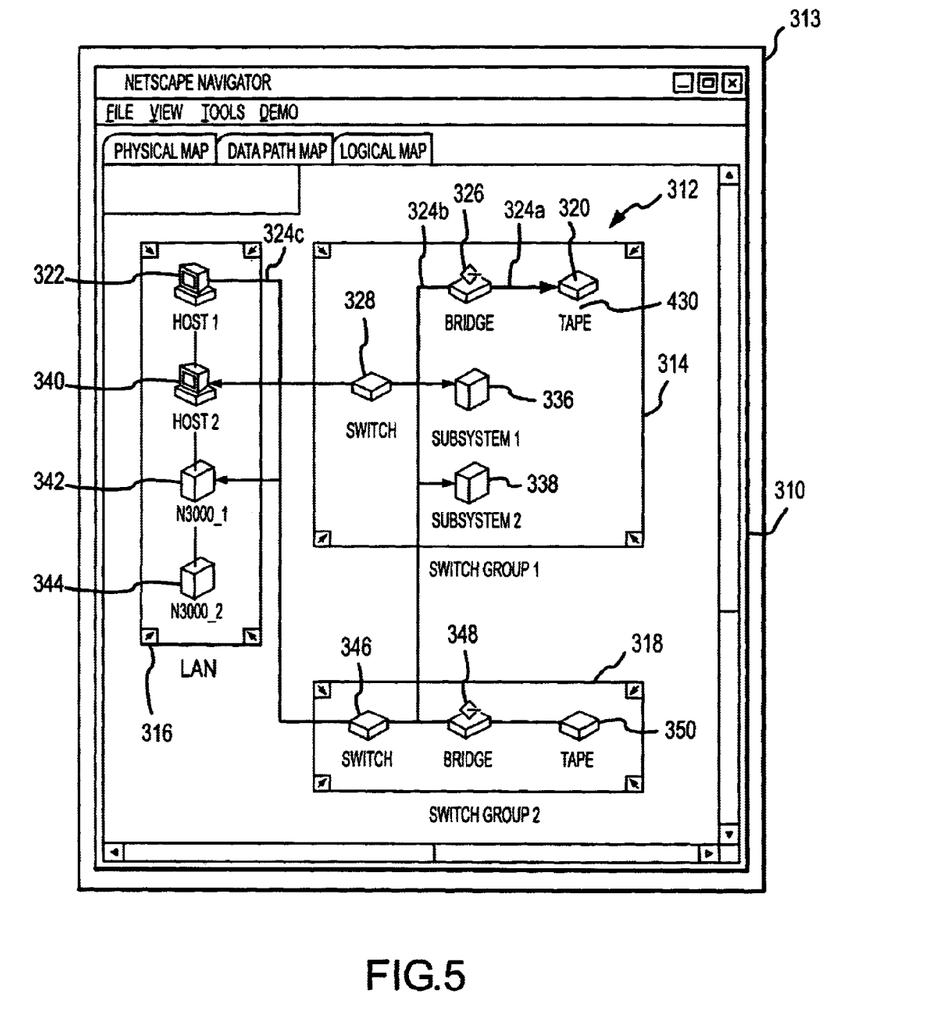
FIG. 5 is a graphical representation of the FIG. 3 network with a datapath being highlighted between a first node and a second node in the network.

As shown in FIG. 4, a cursor 430 is shown on the display 313 overlapping the graphical representation of the SAN 312. The cursor image position on the display 313 is under control of the user based on the user's movements of a mouse (or keyboard) that is electronically connected to the display 313. The graphical user interface includes programming instructions to detect when the image position of the cursor 430 has been used to select a first node (i.e., a source node such as node 322) via, for example, a point and click operation. The interface then detects when the cursor is within a predetermined distance (e.g., predetermined number of pixel locations) from the graphical representation of at least one of the representation of datapath 324 (i.e., any segment of datapath) and the desired destination node (e.g., node 320). Once it is detected that the image position of the cursor 430 is within a predetermined distance from the graphical representation of the datapath 324, the graphical representation of the datapath 324 is highlighted as shown in FIG.5. The datapath highlighted includes segments 324*a*, 324*b*, and 324*c*. Alternately, the datapath is highlighted if cursor is placed within a predetermined distance of the node 320.

The process to detect when the image position of the cursor 430 is within a predetermined distance from the graphical representation of the datapath 324 will be further explained with reference to FIG. 6, and a similar detection process can be used to highlight the datapath when the cursor has been detected to be within a predetermined distance from a desired datapath destination node.

Figure 6A:
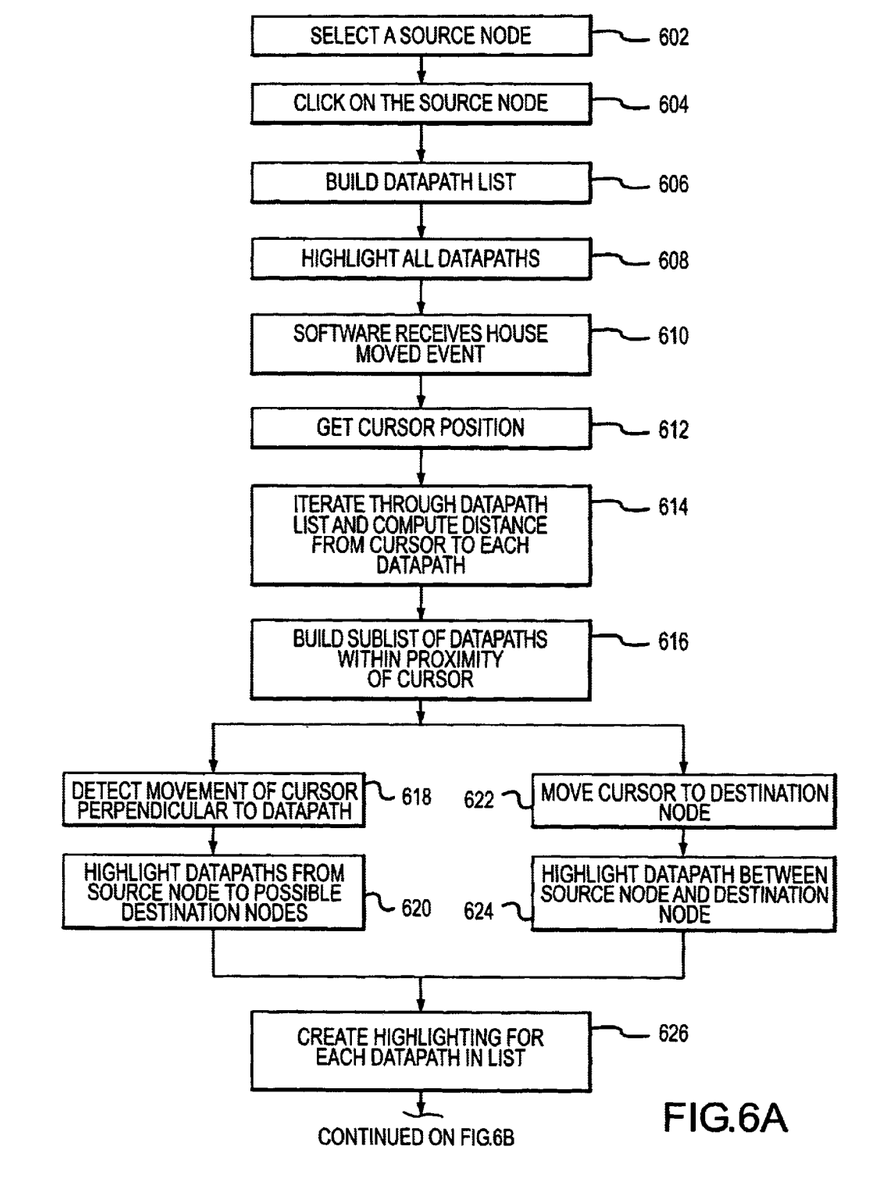
FIGS. 6A and 6B is a flowchart illustrating an exemplary method of providing programming instructions to detect when an image position of a cursor is within a predetermined distance from a graphical representation of a datapath.
Figure 6B:
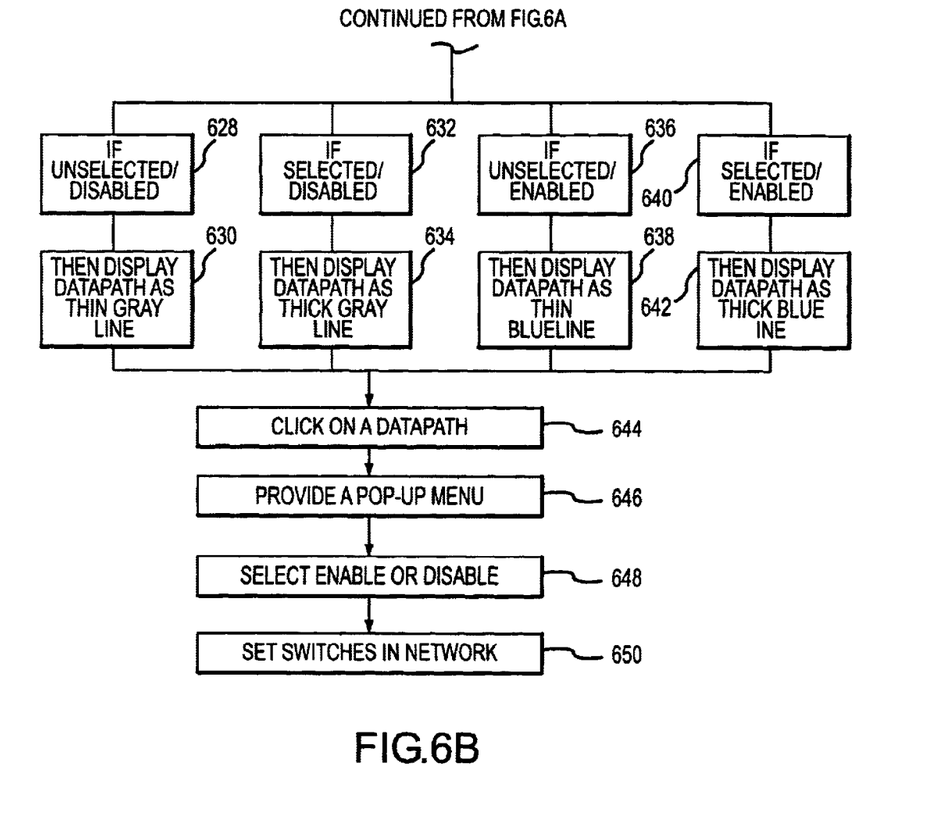

As shown in FIG. 6, the user first selects a source node on the graphical representation in step 602. The user then clicks on the source node (step 604) and the system builds a datapath list from the selected source node (step 606). The system highlights all the datapaths extending from the source node (step 608). After the user moves the mouse to the desired area, the system software receives information relating to the mouse movement event (step 610). The system then gets the cursor position in step 612 iterates through the datapath list, and computes the distance from the cursor to each datapath in step 614. The system builds a sublist of datapaths within the proximity of the cursor in step 616.

Depending upon the method of selection of the user, the user can move the cursor perpendicular to a datapath (step 618) such that the system detects the movement and highlights the datapath from the source node to the possible destination nodes (step 620). In the alternative, the user can move the cursor to a second, destination node (step 622) such that the system highlights the datapath between the source node and the destination node (step 624).

In step 626, the system creates highlighting for each datapath in the list, and depending upon the status of the datapath, the visual representation of the datapath is displayed. If the datapath is unselected and disabled then the datapath is displayed as a thin grey line (steps 628, 630). If the data path is selected and disabled , then the datapath is displayed as a thick grey line (steps 632, 634). If the data path is unselected and enabled, then the datapath is displayed as a thin blue line (steps 636, 638). If the data path is selected and enabled, then the datapath is displayed as a thick blue line (steps 640, 642).

The user then clicks on a datapath in step 644. The user supplies an input signal to provide a pop-up window in the graphical representation 310 (step 646). The user then again provides an input signal, which is controlled by the user, to selectively enable or disable the datapath 324 of the SAN 312 that corresponds to the highlighted graphical representation of the datapath 324 (step 648) so that a desired datapath can be selectively enabled or disabled in step 650.

Figure 7:
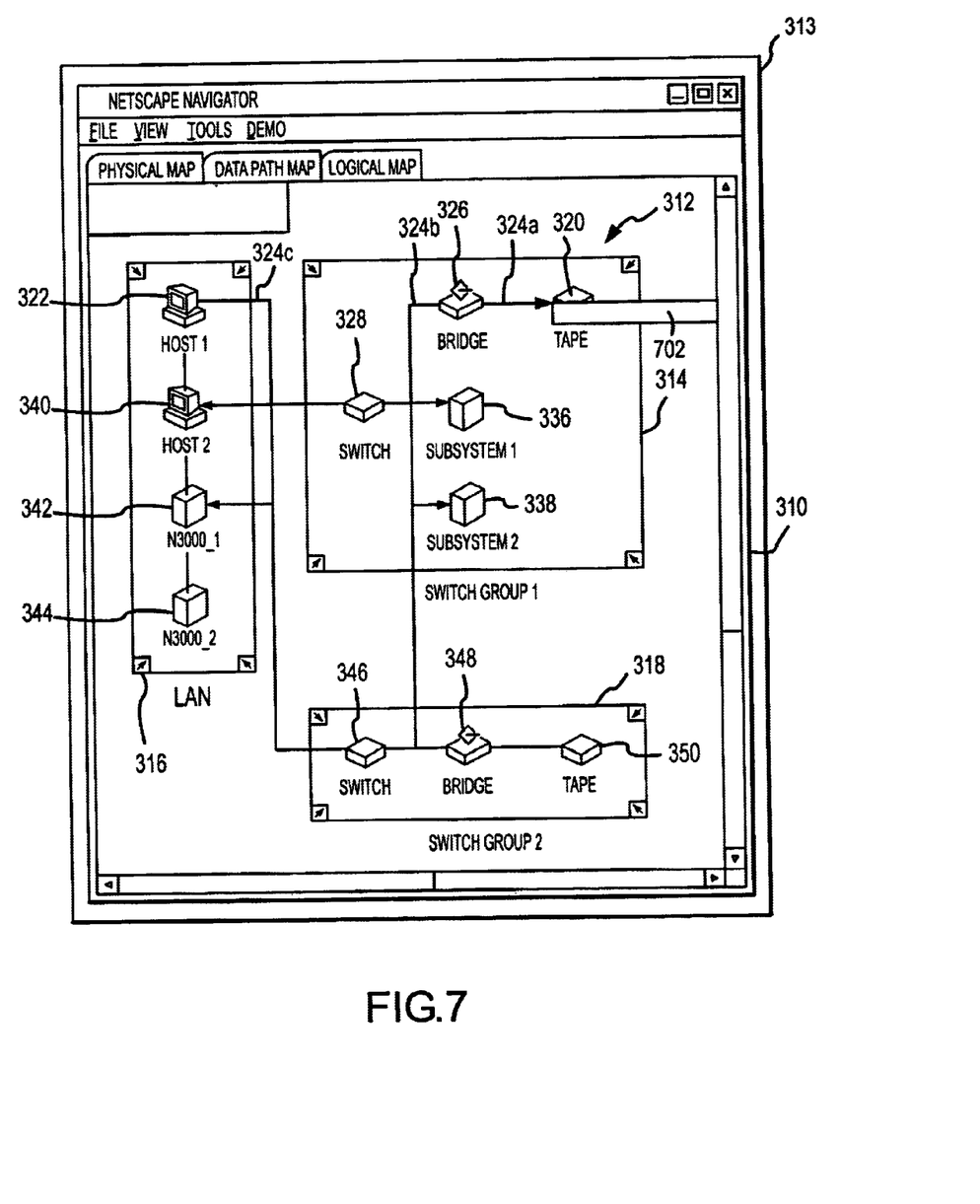
FIG. 7 is a graphical representation of the FIG. 3 network with an exemplary pop-up window to enable the highlighted datapath.

The input signal provided and controlled by the user can, for example, be a click of a mouse which provides a pop-up window. If the datapath 324 is in a disabled state, then the pop-up window will provide a user selection to enable the datapath.

Figure 8:
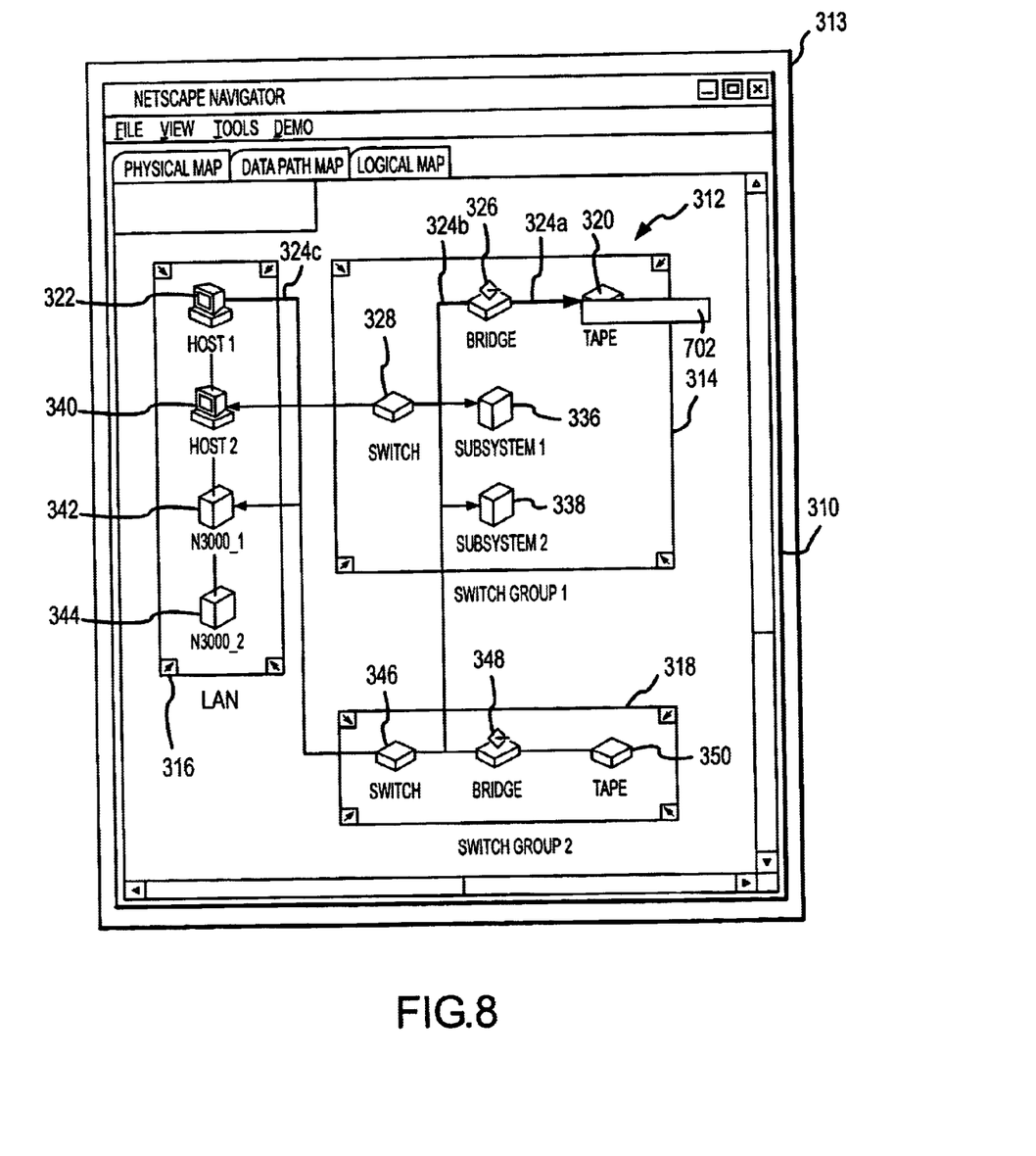
FIG. 8 is a graphical representation of the FIG. 3 network with an exemplary pop-up window to disable the highlighted datapath.

As shown in FIG. 8, if the datapath 324 is in an enabled state, then a pop-up window 702 will allow the user to select the option to disable the datapath. Of course, any user controlled input signals can be used (e.g., keyboard inputs) in place of mouse clicks. Also, the visual display of options can be of any form, and is not limited to a pop-up window.

An exemplary method of operating a graphical user interface of the present application includes the step of sending signals, such as software commands, to the switched network after the user has selectively enabled or disabled the datapath. An exemplary method of computing consequences of enabling or disabling a datapath (i.e., the impact which the enable or disable operation has on the remainder of the network) will be further described with respect to FIG. 9.

Figure 9:
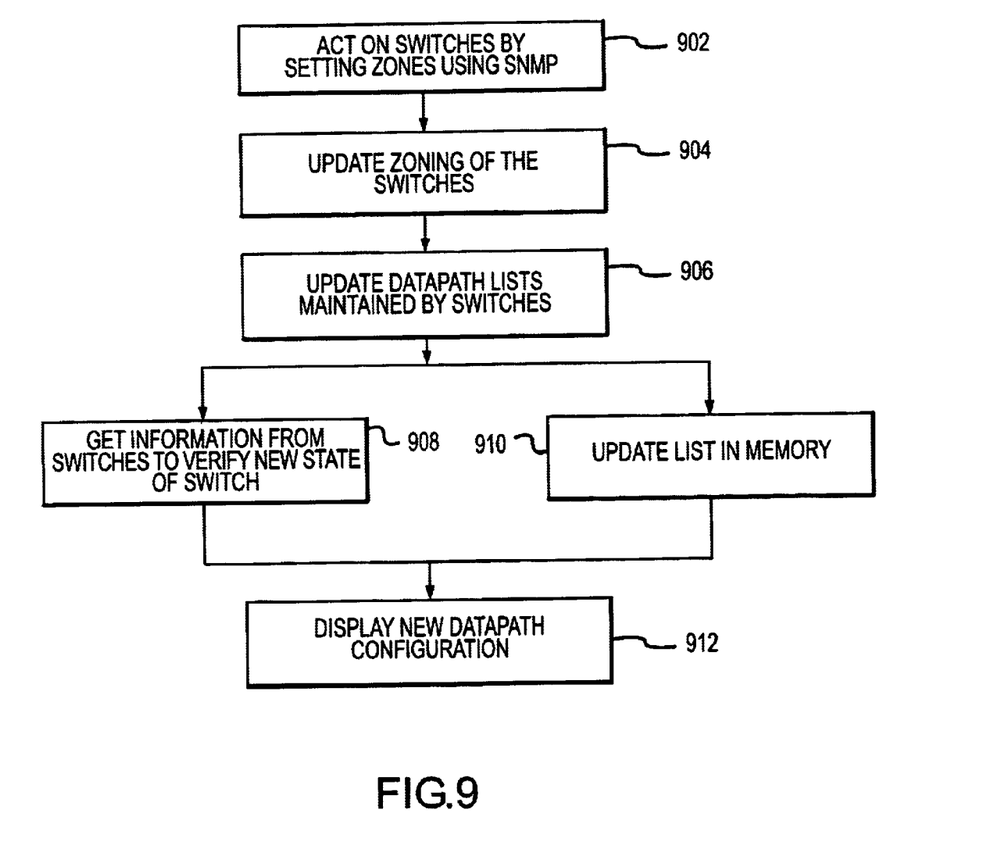
FIG. 9 is a flowchart illustrating an exemplary step of computing the consequences of selectively enabling or disabling a datapath in a network according to the present invention.

In a first step 902, the system acts on the switches in the physical network by setting zones using, for example, the known Simple Network Management Protocol (SNMP). The zoning of the switches is updated in step 904. In step 906, the datapath lists maintained by the switches are updated. The system obtains information from the switches in step 908 to verify the new state of each switch, or in the alternative, the system updates the list in system memory (step 910). Another alternative is for the system to perform both steps of obtaining information from the switches to verify the new state of each switch and to update the list in system memory. The new configuration of the datapath is then shown on the display (step 912). In an alternative new embodiment, a pop-up window can be provided to the user to confirm that the datapath shown on the display is the desired configuration. The user then selects the configuration in the pop-up window if the configuration shown is desired, or returns to the selection step to enable or disable the datapaths.

We claim:

1. A method of operating a graphical user interface to allow a user to selectively enable/disable a datapath connected to carry communications between a first node and a second node of a switched network, the method comprising the steps of:

displaying a graphical representation of the first node, the second node, and the datapath on a display;

displaying a cursor on the display whose image position on the display is under control of the user;

selecting one of the first node and the second node;

detecting when the image position of the cursor is within a predetermined distance from the graphical representation of at least one of the datapath and the second node;

highlighting the graphical representation of the datapath when the displayed cursor is detected to be within the predetermined distance; and selectively enabling/disabling the datapath of the switched network that corresponds to the highlighted graphical representation in response to an input signal controlled by the user.

2. The method according to claim 1, wherein the input signal controlled by the user provided by actuating a mouse.

3. The method according to claim 1, comprising the step of:

displaying a pop-up menu in response to the input signal controlled by the user.

4. The method according to claim 1, comprising the step of:

sending commands to the network after selectively enabling/disabling the datapath.

5. The method according to claim 1, comprising the step of:

producing signals for selectively enabling/disabling the datapath.

6. The method according to claim 1, wherein the network is a storage area network.

7. The method according to claim 1, comprising the step of:

highlighting the graphical representation of the datapath at the time the first node is selected.

8. The method according to claim 1, wherein the highlighting of the graphical representation of the datapath indicates whether the datapath is enabled or disabled.

9. The method of according to claim 1, wherein the highlighting indicates whether the datapath has been selected or not selected.

10. The method according to claim 9, wherein the highlighting of the graphical representation of the datapath indicates whether the datapath is enabled or disabled.

* * * * *